Nov. 21, 1939.  B. F. BERKHEIMER  2,180,788
DUO-FUNCTIONAL COOK AND HEATING STOVE
Filed Jan. 9, 1939  3 Sheets-Sheet 1

INVENTOR
Benjamin F. Berkheimer
BY
Henry G. Dybvig
ATTORNEY

Nov. 21, 1939.   B. F. BERKHEIMER   2,180,788
DUO-FUNCTIONAL COOK AND HEATING STOVE
Filed Jan. 9, 1939   3 Sheets-Sheet 2
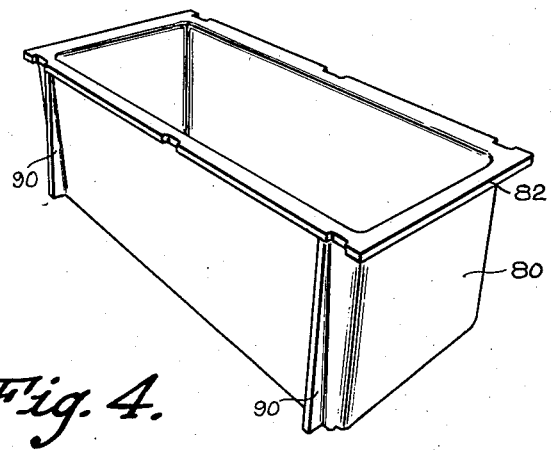
Fig. 4.
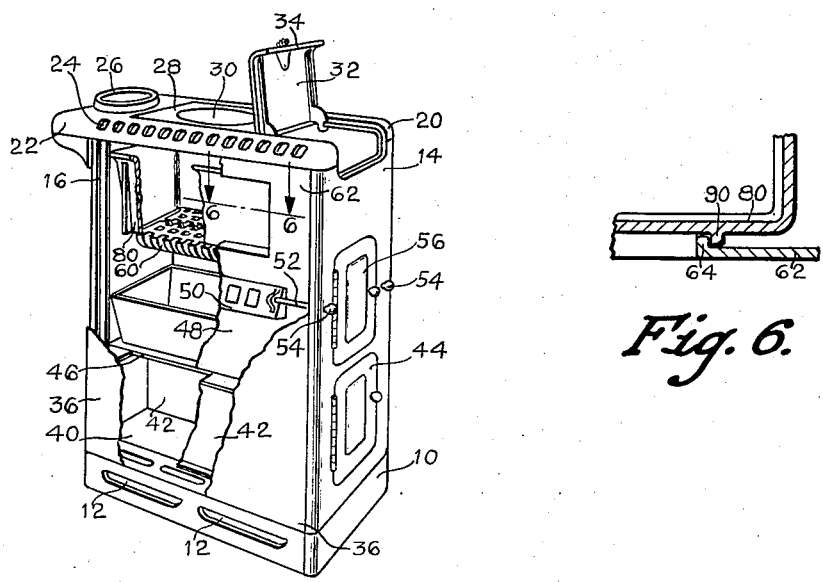
Fig. 5.
Fig. 6.
INVENTOR
Benjamin F. Berkheimer
BY
ATTORNEY Nov. 21, 1939.   B. F. BERKHEIMER   2,180,788
DUO-FUNCTIONAL COOK AND HEATING STOVE
Filed Jan. 9, 1939   3 Sheets-Sheet 3

INVENTOR
Benjamin F. Berkheimer
BY
Henry G. Dylvig
ATTORNEY

Patented Nov. 21, 1939

2,180,788

UNITED STATES PATENT OFFICE 2,180,788

DUO-FUNCTIONAL COOK AND HEATING STOVE

Benjamin F. Berkheimer, Greenville, Ohio

Application January 9, 1939, Serial No. 249,974

9 Claims. (Cl. 126—4)

This invention relates to stoves and more particularly to the arrangement of the fire-box or fire bowl of a combined kitchen cook stove and heating stove arrangement. This invention is an improvement upon the stove shown and described in my copending application Serial No. 210,754 filed May 28, 1938, for Heat transfer device. In the disclosure in the above identified application, the lining for the fire-box was arranged on the inside of a metallic casing, the outside of which constituted a radiating surface.

In the embodiment disclosed herein, the fire-box lining is made from a continuous metallic member, having the outside walls thereof exposed as a radiating surface for the air circulating through the air passages in the stove, so as to heat the air in the room.

An object of this invention is to provide a combined kitchen cook stove and heating stove wherein the fire-box lining provides a radiating surface coming in direct contact with the air to be heated.

Another object of this invention is to provide a stove that is efficient, economical to produce, neat in appearance and at the same time dependable and lasting.

Another object of this invention is to provide a stove having an improved air passage for circulating air from the room to be heated.

Other objects and advantages reside in the construction of parts, the combination thereof and the mode of operation, as will become more apparent from the following description.

In the drawings Figure 1 discloses a perspective view of the preferred embodiment.

Figure 4 is a perspective view showing the fire-box lining removed from the stove.

Figure 5 is a perspective view with parts broken away, so as to show the general arrangement or lay-out of the stove.

Figure 6 is a fragmentary cross sectional view taken substantially on the line 6—6 of Figure 5.

Figure 1:
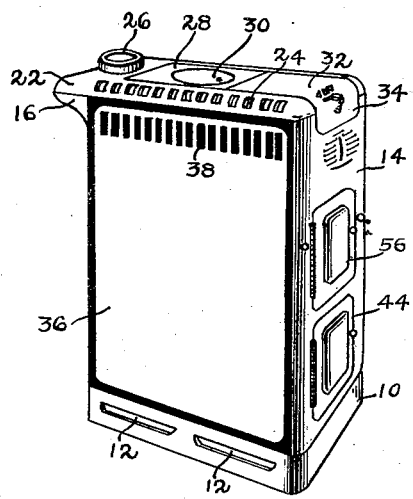
Figure 2:
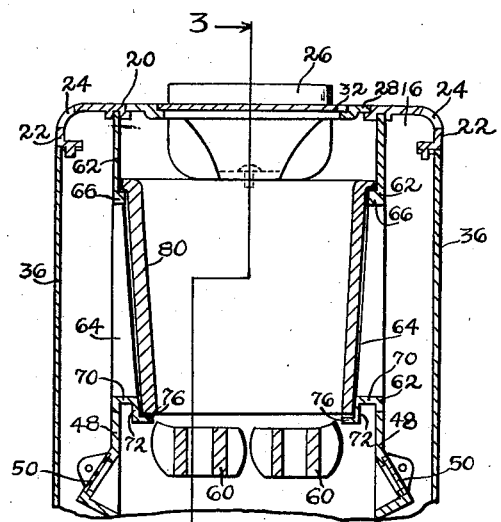
Figure 2 is a vertical, transverse, fragmentary, sectional view taken through the fire-box of the stove shown in Figure 1 and taken substantially on the line 2—2 of Figure 3.
Figure 3:
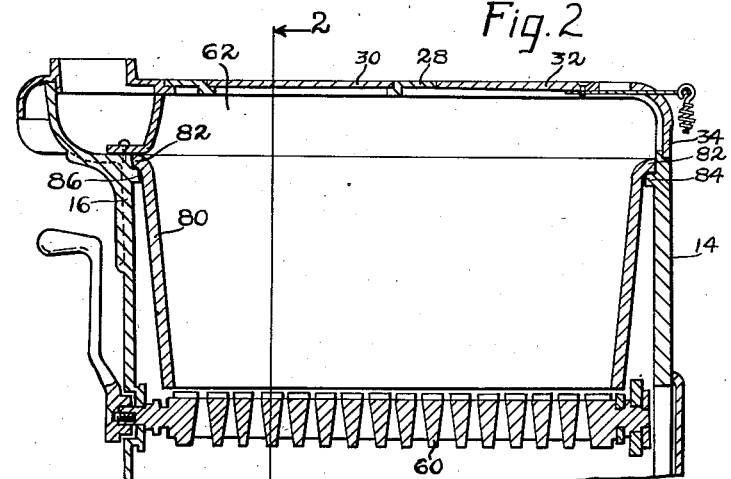
Figure 3 is a vertical, longitudinally extending fragmentary, sectional view taken through the fire-box substantially on the line 3—3 of Figure 2.

For some uses it is very desirable to have a combined cook stove and heating stove which has a duo-functional purpose, in that it serves both as a cook stove and as a heater. This type of a stove has been found advantageous in camps, in cabins, in household use in the milder climates and as an auxiliary stove in the more severe climates, augmenting the use of an electric or gas range. Such a stove is found to have considerable heating capacity for heating a room in cool weather.

Due to the varied uses to which this stove may be put, it is very desirable to have a neat appearing stove, that may be cheaply constructed; but at the same time, harmonizing with more expensive and luxurious stoves and surrounding equipment. That being the case, it has been found very desirable to enclose the stove by enameled panels, so as to present a neat appearance. This has been accomplished by mounting the stove proper, that is, the fire-box of the stove, in the center of the structure and arranging the side panels in spaced relation from the outside of the fire-box, so as to provide air passages between the panels and the fire-box, permitting the circulation of the air to be heated, as will be more fully understood from the accompanying drawings.

In the drawings, the reference character 10 includes a continuous base member provided with longitudinal slots 12, which base member supports a front end frame member 14 and a rear end frame member 16. These end frame members support a top 20, provided with a flue opening 26 and a pair of overhanging ledges 22 having a series of aligned apertures 24. This top frame member may be provided with a suitable lid supporting member 28 supporting a lid 30 and terminating in a drop edge fuel feed door 32 having a downwardly projecting lip or flange 34. The sides of the stove are enclosed by a pair of panels 36, one on either side, secured in position, as more fully described in my copending application referred to above. The panels 36 are provided with a plurality of longitudinal openings 38 along the top thereof, so that air entering through the slots 12 in the base 10 may circulate upwardly and escape through the openings 24 in the overhanging ledge 22 and the openings 38, as will appear more fully later.

A floor member 40 is supported on top of the base 10 and supports a pair of partitions 42, one on each side, which partitions are arranged in spaced relation from the panels 36. The partitions 42, together with the base or floor 40, cooperate to form a storage compartment that is accessible through a suitable door 44 in the front frame member 14. A partition 46, suspended from the end frames 14 and 16, forms a ceiling for the storage compartment and a base for an ash pit or pan compartment bounded on the sides by partitions 48, one on either side, which partitions are provided with dampers 50, each controlled through a suitable shaft 52 by a knob 54, accessible from the front of the stove. The ash pan may be removed through a door 56 in the front end of the stove.

Suitable grates 60 are supported above the ash pit in a manner similar to that disclosed in my copending application. Above the partitions 48 is mounted a fire pit frame member 62, provided with inwardly directed flanges 64 on the sides of the opening therein. An inwardly directed rib portion 66 extends across the top of the opening and continuously across the entire length of the fire pit frame member 62. The upper edge of member 62 is seated in a suitable channel, or otherwise secured to the top member 20. The fire pit frame member 62 is also provided with a sill portion 70, provided with a downwardly projecting flange 72, merging into an inwardly directed flange 76 that supports the fire-box lining member 80, having an outwardly directed peripheral flange 82 extending continuously around the top of member 80 and resting upon the rib or flange portion 66 integral with the fire pit frame member 62 and resting upon a rib 84 integral with and extending across the front frame member 14 and the rib or flange 86 integral with and extending across the rear end frame 16. The fire-box lining 80 may be held in position by suitable bolts not shown. The fire-box is preferably cemented or sealed along the supporting edges, including the periphery around the opening in fire pit frame member 62, so as to provide air-tightness to prevent the escape of smoke and gas fumes from the fire-box to the air passages located between the exposed area of the fire-box and the panels 36.

Figure 8:
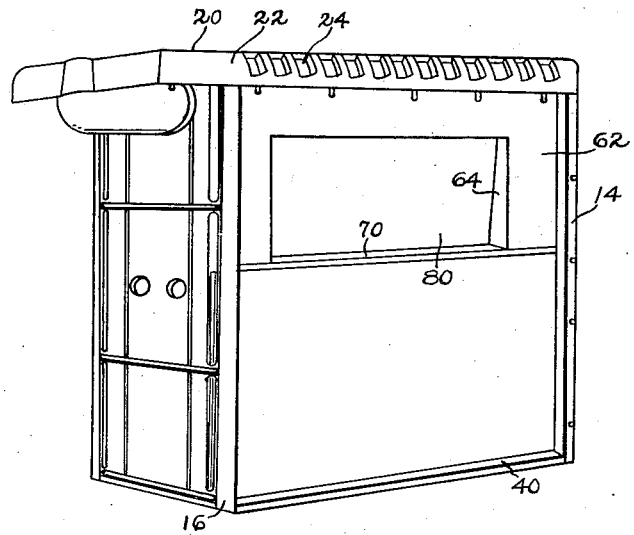
Figure 8 is a side view showing the stove with the outside panels removed.
Figure 7:
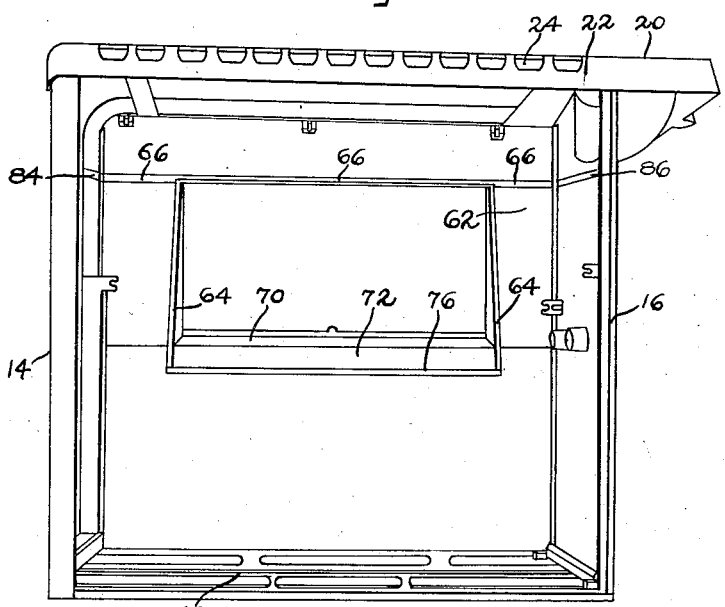
Figure 7 shows a side perspective view of the top, the front and rear end frames and the off side fire pit frame, as viewed with the fire-box lining removed.

The fire-box lining member 80 is provided with vertical flanges 90 that abut the inwardly directed flanges 64 extending along the sides of the opening in member 62, so as to form a seat for cement or other suitable sealing material, deterring the escape of dust from the ashes and the like into the air passages. From the above arrangement, as may best be seen in Figure 8, the sides of the fire-box are exposed through the opening of the fire pit frame member 62, so as to permit the air from the room to enter the slots 12 of the base 10 and escape through the openings 24 and 38, to come into direct radiating contact with the exposed portions of the side walls of the continuous length fire-box lining 80.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described my invention, I claim:

1. A duo-functional stove for use as a kitchen cook stove and as a heating stove having a frame supporting a fire-box in the center and near the top thereof, the fire-box being arranged in spaced relation from the sides of the stove so as to leave air passages for the circulation of air past the fire-box, the combination of a pair of fire pit frame members one on either side of the fire-box and in spaced relation from the outside of the walls of the stove, said fire pit frame members having openings therein, and a continuous fire-box lining having the outside exposed to the air to be heated through the openings in the fire pit frame members.

2. A duo-functional stove for use as a kitchen cook stove and as a heating stove having a pair of end frame members joined by side panels, said end frame members supporting a fire-box in the center and near the top thereof, the fire-box being arranged in spaced relation from the sides of the stove so as to leave air passages for the circulation of air past the fire-box, the combination including a top member of the cook stove forming the top of the stove, which top is provided with overhanging ledges having marginal apertures for the passage of air currents, a pair of fire pit frame members depending from the top and in spaced relation from the sides thereof and projecting downwardly on either side of the fire-box in spaced relation from the outside of the side panels of the stove, said fire pit frame members having openings therein and a continuous fire-box lining having the outside exposed to the air to be heated through the openings in the fire pit frame members, said air circulating upwardly through the openings in the overhanging ledges in the top of the stove into the room to be heated.

3. A duo-functional stove for use as a kitchen stove and as a heating stove having a pair of end frame members supporting a fire-box in the center and near the top thereof, the combination including a top for the cook stove forming the top of the duo-functional stove and provided with overhanging ledges having marginal apertures, a pair of panel members projecting downwardly in flush relation with the outer edges of the ledges and forming sides of the stove, a pair of fire pit frame members depending from the top arranged in spaced relation from the panels so as to form an air passage between the panels and the fire pit frame members, having openings therein, means for admitting air from the bottom of the stove into the air passage, and a continuous fire-box lining having the outside exposed to the air in the air passage through the openings in the fire pit frame members, the air circulating through said means upwardly through said passage and outwardly through the marginal apertures in the ledges into the room to be heated.

4. A duo-functional stove for use as a kitchen cook stove and as a heating stove, the combination including a cook stove top, a pair of fire pit depending frame members projecting downwardly from the cook stove top, said frame members having openings therein, a portion of said frame members constituting radiating surfaces and having the inside exposed to the fire pit, and a continuous length fire pit lining member supported by said frame members, said fire pit lining member having portions exposed as radiating surfaces through the openings in the frame members so as to come in direct contact with the air to be heated.

5. A duo-functional stove for use as a kitchen cook stove and as a heating stove, the combination including a cook stove top, a pair of fire pit depending frame members projecting downwardly from the cook stove top, said frame members having openings therein, a portion of said frame members constituting radiating surfaces and having the inside exposed to the fire pit, and a continuous length fire pit lining member supported by said frame members, said fire pit lining member having portions exposed as radiating surfaces through the openings in the frame members so as to come in direct contact with the air to be heated, the peripheral juncture of the opening in each of said frames and the fire pit lining being cemented to seal this juncture against the passage of gases, smoke and dust.

6. A duo-functional stove for use as a kitchen cook stove and as a heating stove, the combination including oppositely disposed panel members, a cook stove top, a fire pit assembly underlying the top and arranged in spaced relation from the panel members so as to form passages between the panel members and the fire pit assembly for the circulation of the air to be heated, said fire box assembly including suspending means extending downwardly from the kitchen stove top and a continuous length fire pit lining member supported by said suspending means, the sides of the fire pit lining member being exposed to the air circulating through said passages.

7. A duo-functional stove for use as a kitchen cook stove and as a heating stove having a frame supporting a fire-box in the center and near the top thereof, the fire-box being arranged in spaced relation from the sides of the stove so as to leave air passages for the circulation of air past the fire-box, the combination of a pair of fire pit frame members one on either side of the fire-box, said frame members being arranged in spaced relation from the outside walls of the stove, each being provided with a rectangular opening, and fire-box lining means having the outside exposed to the air to be heated through the rectangular openings in the fire pit frame members.

8. A duo-functional stove for use as a kitchen cook stove and as a heating stove having a pair of end frame members joined by side panels, said end frame members supporting a fire-box in the center and near the top thereof, the fire-box being arranged in spaced relation from the sides of the stove so as to leave air passages for the circulation of air past the fire-box, the combination including a top member of the cook stove forming the top of the stove, which top is provided with overhanging ledges having marginal apertures for the passage of air currents, a pair of fire pit frame members depending from the top and in spaced relation from the sides thereof and projecting downwardly on either side of the fire-box in spaced relation from the outside of the side panels of the stove, said fire pit frame members having openings therein, and fire-box lining means having the outside exposed to the air to be heated through the openings in the fire pit frame members, said air circulating upwardly through the openings in the overhanging ledges in the top of the stove into the room to be heated.

9. A duo-functional stove for use as a kitchen cook stove and as a heating stove, the combination including a cook stove top, a pair of fire pit depending frame members projecting downwardly from the cook stove top, said frame members having rectangular openings therein, inwardly directed flanges bounding the openings, a portion of said frame members constituting radiating surfaces and having the inside exposed to the fire pit, and fire pit lining means supported by said frame members, said fire pit lining means having portions exposed as radiating surfaces through the openings in the frame members so as to come into direct contact with the air to be heated.

BENJAMIN F. BERKHEIMER.